United States Patent Office 2,895,957
Patented July 21, 1959

2,895,957

ω(2,6-DIMETHYL PIPERIDINE-1)α,α-DIPHENYL BUTYRAMIDES

Brooke D. Aspergren and Robert B. Moffett, Kalamazoo, Mich., assignors to The Upjohn Company, Kalamazoo, Mich., a corporation of Michigan No Drawing. Application November 19, 1956
Serial No. 622,823

5 Claims. (Cl. 260—294)

The present invention relates to novel organic compounds and is more particularly concerned with the novel 2,6-dimethyl-α,α-diphenyl-1-piperidinebutyronitrile free base, 2,6-dimethyl-α,α-diphenyl-1-piperidinebutyramide free base, and 2,6-dimethyl-α,α-diphenyl-1-piperidinebutyramide acid addition and lower-alkyl quaternary ammonium salts.

The 2,6-dimethyl-α,α-diphenyl-1-piperidinebutyronitrile free base, 2,6-dimethyl-α,α-diphenyl-1-piperidinebutyramide free base, and 2,6-dimethyl-α,α-diphenyl-1-piperidinebutyramide acid addition salts are useful intermediates for the preparation of the pharmacologically active 2,6-dimethyl-α,α-diphenyl-1-piperidinebutyramide lower-alkyl quaternary ammonium salts.

The quaternary ammonium salts of the present invention possess excellent antisalivary activity, and weak gastric antisecretory activity and weak antispasmodic activity. This is in contrast to the combination of properties shown by quaternary ammonium salts of closely related unsubstituted amides (i.e., primary amides) some of which show, for example, poor antisalivary activity combined with fair gastric antisecretory activity, and fair antispasmodic activity; while others show, for example, good antisalivary activity combined with good gastric antisecretory activity and good antispasmodic activity. Thus the quaternary ammonium salts of the present invention are desirable where excellent antisalivary activity and weak gastric antisecretory and weak antispasmodic activity are desired.

The data given in Table I are illustrative of the differentiating effects noted above. The antispasmodic index was determined by intravenous administration to Thiry-Vella dogs and equated to atropine equals 1.0 (low values mean low activity). The antisecretory activity was determined intravenously in rats and is given as the $ED_{50}$ in mg./kg.—the effective dose necessary to reduce gastric secretion by fifty percent (low values mean high activity). The antisalivary activity was determined intravenously in rats and is given as the $ED_{50}$ in mcg./kg.—the effective dose necessary to reduce salivary secretion by fifty percent (low values mean high activity).

The data in Table I shows that 2,6-dimethyl-α,α-diphenyl-1-piperidinebutyramide methobromide possesses an unique combination of properties which would not be expected from the properties of closely related compounds. Thus the quaternary ammonium salts of the invention possess a combination of unusually high antisalivary activity, weak gastric antisecretory activity and weak antispasmodic activity, which combination of properties is not possessed by the related compounds. For example, compound A combines poor antisalivary activity, fair gastric antisecretory activity and fair antispasmodic activity. Compound B combines good antisalivary activity with good gastric antisecretory activity and good antispasmodic activity.

The compounds of the present invention can be prepared by reacting diphenylacetonitrile in the presence of an alkali metal amide, advantageously lithium amide, with 1-(2-chloroethyl)-2,6-dimethylpiperidine to produce 2,6-dimethyl-α,α-diphenyl-1-piperidinebutyronitrile free base. This free base is hydrolyzed to produce 2,6-dimethyl-α,α-diphenyl-1-piperidinebutyramide free base according to the procedure of Cheny et al., J. Org. Chem. 17, 770 (1952). The latter free base (amide) is purified by conversion to an acid addition salt such as the hydrochloride, sulfate, hydrobromide, phosphate, lactate, acetate, citrate, and the like. The acid addition salt is reconverted to the purified free base, and the purified free base is reacted in an inert solvent such as benzene with a quaternary ammonium salt-producing compound such as methyl bromide, methyl iodide, methyl chloride, ethyl bromide, methyl p-toluenesulfonate, butyl iodide, ethyl sulfate, ethyl iodide, and the like to produce the desired quaternary ammonium salt.

The following example is illustrative of the process and products of the present invention but is not to be construed as limiting.

PREPARATION OF 2,6-DIMETHYL-α,α-DIPHENYL-1-PIPERIDINEBUTYRAMIDE METHOBROMIDE

EXAMPLE

A. *1-(2-chloroethyl)-2,6-dimethylpiperidine*

A solution of 1-(2-chloroethyl)-2,6-dimethylpiperidine was prepared by reacting 73 grams of the corresponding hydrochloride [Cusic et al., J. Org. Chem. 16, 1921 (1951)] with strong aqueous sodium hydroxide solution, extracting the mixture repeatedly with toluene, and drying the toluene solution over anhydrous potassium carbonate.

B. *2,6 - dimethyl-α,α-diphenyl - 1 - piperidinebutyronitrile free base*

A mixture of 10.2 grams (0.444 mole) of lithium amide, 66.5 grams (0.344 mole) of diphenylacetonitrile and 800 milliliters of dry toluene was heated under reflux with stirring for four hours. The solution of 1-(2-chloroethyl)-2,6-dimethylpiperidine, Part A, was slowly added to the reaction mixture and the mixture was heated

TABLE I

| Compound: | Antispasmodic Index | Gastric antisecretory activity | Antisalivary activity |
|---|---|---|---|
| (methobromide structure) | 1.0 | 0.2 | <1.0 |
| Related compounds: | | | |
| (A) | 2.0 | 0.1 | 6.0 |
| (B) | 4.0 | 0.003 | 1.0 | under reflux with stirring for eighteen hours. The mixture was cooled and treated with water and the toluene layer was extracted with dilute hydrochloric acid. The free base was liberated from the aqueous solution of the hydrochloride with sodium hydroxide and extracted with benzene. The resulting benzene solution was dried over anhydrous sodium sulfate, the benzene was removed by distillation, and the desired 2,6-dimethyl-α,α-diphenyl-1-piperidinebutyronitrile free base was recovered by distillation under reduced pressure. The yield was 66.5 grams (58 percent) of an oil which had a boiling point of 170 degrees centigrade at 0.005 millimeter of mercury.

*Analysis*—Calculated for $C_{23}H_{28}N_2$: C, 83.08; H, 8.48; N, 8.43. Found: C, 82.70; H, 8.50; N, 8.70.

C. *2,6-dimethyl - α,α - diphenyl - 1 - piperidinebutyramide free base and hydrochloride*

A mixture of 66 grams of 2,6-dimethyl-α,α-diphenyl-1-piperidinebutyronitrile free base, Part B, 125 milliliters of concentrated sulfuric acid, and 12.5 milliliters of water was heated on a steam bath with stirring for five hours. The mixture was poured onto ice and made basic with ammonium hydroxide. The solidified product, 2-6-dimethyl-α,α-diphenyl-1-piperidinebutyramide free base, was dissolved in 200 milliliters of ethyl acetate and a slight excess of ethanolic hydrogen chloride was added. The gummy solid was recrystallized from methyl ethyl ketone to yield 2,6-dimethyl-α,α-diphenyl-1-piperidinebutyramide hydrochloride which had a melting point of 225 to 227 degrees centigrade.

*Analysis*—Calculated for $C_{23}H_{31}ClN_2O$: C, 71.38; H, 8.08; Cl, 9.16; N, 7.24. Found: C, 71.23; H, 8.26; Cl, 8.87; N, 7.16.

Following the procedure of Part C, above, other acid addition salts such as 2,6-dimethyl-α,α-diphenyl-1-piperidinebutyramide sulfate, 2,6 - dimethyl - α,α - diphenyl-1-piperidinebutyramide hydrobromide, 2,6 - dimethyl-α,α-diphenyl-1-piperidinebutyramide acetate, 2,6 - dimethyl-α,α-diphenyl-1-piperidinebutyramide citrate, 2,6-dimethyl-α,α-diphenyl-1-piperidinebutyramide phosphate, 2,6-dimethyl-α,α-diphenyl-1-piperidinebutyramide lactate, and the like, can be produced by substituting the corresponding acid for hydrogen chloride.

D. *2,6-dimethyl-α,α-diphenyl-1-piperidinebutyramide methobromide*

Four grams (0.0103 mole) of 2,6-dimethyl-α,α-diphenyl-1-piperidinebutyramide hydrochloride was shaken with an excess of aqueous sodium hydroxide solution and the mixture was extracted with benzene. The benzene solution of 2,6-dimethyl-α,α-diphenyl-1-piperidinebutyramide free base was dried with anhydrous sodium sulfate and decanted therefrom. To this solution was added thirty grams of cooled methyl bromide and the reaction mixture was allowed to stand at 23 degrees centigrade for seven days. The precipitate was recrystallized from 25 milliliters of isopropanol and the resulting 2,6-dimethyl-α,α-diphenyl-1-piperidinebutyramide methobromide weighed 4.2 grams and had a melting point of 224 to 225 degrees centigrade.

*Analysis*—Calculated for $C_{24}H_{33}BrN_2O$: C, 64.71; H, 7.47; Br, 17.94; N, 6.29. Found: C, 64.62; H, 7.36; Br, 17.52; N, 6.60.

Following the procedure of Part D, above, other lower-alkyl quaternary ammonium salts such as 2,6-dimethyl-α,α-diphenyl-1-piperidinebutyramide ethobromide, 2,6-dimethyl-α,α-diphenyl-1-piperidinebutyramide methochloride, 2,6-dimethyl - α,α - diphenyl-1-piperidinebutyramide ethosulfate, 2,6-dimethyl-α,α-diphenyl-1-piperidinebutyramide methiodide, 2,6-dimethyl-α,α-diphenyl-1-piperidinebutyramide ethiodide, 2,6-dimethyl-α,α-diphenyl-1-piperidinebutyramide methyl p-toluenesulfonate, 2,6-dimethyl-α,α-diphenyl-1-piperidinebutyramide butyl iodide, and the like can be produced by substituting the corresponding lower-alkyl quaternary ammonium salt-producing compound for methyl bromide.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 2,6-dimethyl-α,α-diphenyl - 1 - piperidinebutyramide free base.
2. 2,6-dimethyl-α,α-diphenyl - 1 - piperidinebutyramide non-toxic acid addition salts.
3. 2,6-dimethyl-α,α-diphenyl - 1 - piperidinebutyramide hydrochloride.
4. 2,6-dimethyl-α,α-diphenyl - 1 - piperidinebutyramide lower-alkyl quaternary ammonium salts.
5. 2,6-dimethyl-α,α-diphenyl - 1 - piperidinebutyramide methobromide.

References Cited in the file of this patent

UNITED STATES PATENTS

| | | |
|---|---|---|
| 2,782,206 | Aspergren | Feb. 19, 1957 |
| 2,823,233 | Speeter | Feb. 11, 1958 |

OTHER REFERENCES

Dupre: J. Chem. Soc., 1949, pp. 500–510, abstracted from Chem. Abstracts, vol. 43, pp. 9052–53 (1949).

Cheney: J. Org. Chem., col. 17, pp. 770–7, abstracted from Chem. Abstracts, vol. 47, p. 1648(e) (1953).